United States Patent [19]

Swift et al.

[11] 4,158,621

[45] Jun. 19, 1979

[54] PROCESS FOR INCREASING GASOLINE YIELD AND QUALITY DURING CATALYTIC CRACKING OF HIGH METALS CONTENT CHARGE STOCKS USING AN ALUMINA-ALUMINUM PHOSPHATE-SILICA-ZEOLITE CATALYST

[75] Inventors: Harold E. Swift, Gibsonia; John J. Stanulonis, Pittsburgh; Elizabeth H. Reynolds, Verona, all of Pa.

[73] Assignee: Gulf Research & Development Company, Pittsburgh, Pa.

[21] Appl. No.: 926,886

[22] Filed: Jul. 21, 1978

[51] Int. Cl.$^2$ .................. C10G 11/02; B01J 8/24; B01J 27/18

[52] U.S. Cl. .................. 208/114; 208/251 R; 208/120; 252/437

[58] Field of Search .................. 208/114; 252/437

[56] References Cited

U.S. PATENT DOCUMENTS

| | | | |
|---|---|---|---|
| 3,271,299 | 9/1966 | Kearby | 208/114 |
| 3,342,750 | 9/1967 | Kearby | 208/114 X |
| 3,867,279 | 2/1975 | Young | 208/114 |
| 3,904,550 | 9/1975 | Pine | 208/216 X |
| 3,944,482 | 3/1976 | Mitchell et al. | 208/120 |

Primary Examiner—Delbert E. Gantz
Assistant Examiner—G. E. Schmitkons

[57] ABSTRACT

A process for cracking gasoline feedstock with greater selectivity of gasoline production and greater metals tolerance wherein, said gasoline feedstock is brought into contact with a catalyst comprising a zeolite dispersed in an alumina-aluminum phosphate-silica matrix, said matrix having outstanding thermal stability.

17 Claims, No Drawings

PROCESS FOR INCREASING GASOLINE YIELD AND QUALITY DURING CATALYTIC CRACKING OF HIGH METALS CONTENT CHARGE STOCKS USING AN ALUMINA-ALUMINUM PHOSPHATE-SILICA-ZEOLITE CATALYST

BACKGROUND OF THE INVENTION

1. Field of the Invention

The present invention resides in a process for increasing gasoline yield and quality using a proprietary catalyst comprising a zeolite dispersed in an alumina-aluminum phosphate-silica matrix.

Around the turn of the century, motor vehicles in the United States began to appear in increasing numbers and gasoline obtained a degree of marketable value as a refinery product. Shortly thereafter, demand in the United States for motor fuels began to exceed the amount produced from refinery crude-oil runs geared for producing kerosene, fuel oils, etc., which were very much in demand at the time. Since then, the petroleum industry's most prominent problem has been inventing new and more efficient methods to meet the tremendous demand for gasoline without overproducing other petroleum products at the same time.

Due to the continually increasing demand for gasoline and the ever-shrinking supplies of crude cracking stocks, such as gas oils and the like, more attention has recently been directed to the catalytic cracking of heavier charge stocks such as petroleum residuals. These charge stocks, however, suffer from the disadvantage of having high metals content which is concentrated therein during a normal cracking process. The metals tend to deposit on catalysts and decrease the cracking characteristics thereof in a cracking process. The catalysts herein are particularly formulated to increase the gasoline yield and quality (i.e., BTX) from gas oils during a cracking process and additionally to catalytically crack petroleum residuals with high selectivity to gasoline production as well as having improved metals tolerant characteristics. Examples of typical metals which can be present during the cracking process include: nickel, vanadium, copper, chromium and iron.

2. Description of the Prior Art

The use of zeolitic cracking catalysts has become of increased importance in petroleum cracking processes due to the higher activity characteristics of these catalysts (see "Recycle Rates Reflect FCC Advances", by J. A. Montgomery, Oil & Gas Journal, Dec. 11, 1972, pp 81–86).

Several processes have been proposed in the past wherein zeolite catalysts are utilized to crack crude oils and petroleum residual feedstocks. One such process is set forth in U.S. Pat. No. 3,944,482; entitled "Process for the Cracking of High Metals Content Feedstocks", issued to Mitchell et al, on Mar. 16, 1976. The reference discloses the use of a zeolite catalyst dispersed with a large pore matrix, for example, alumina, alumina silicate clay, etc., in a process to crack high metals content feedstocks. REY-type zeolites are disclosed, however, the particular combination of REY-zeolite composited with an alumina-aluminum phosphate-silica matrix to increase gasoline production in a cracking process is not appreciated.

U.S. Pat. No. 3,835,032; entitled "Catalytic Cracking with Silver-Rare Earth or Copper-Rare Earth Exchanged Y-Type Zeolite"; issued to Dolbear et al, on Sept. 10, 1974, relates to a zeolite hydrocarbon cracking catalyst which consists of synthetic Y-type zeolite exchanged with silver or copper ions in combination with rare earth ions. The exchanged zeolite is combined with an inorganic oxide matrix, for example, inorganic hydrogels, such as silica, alumina and silica-alumina hydrogel. These catalysts are described as capable of producing a high yield of aromatic gasoline fractions of enhanced octane rating.

Another hydrocarbon cracking zeolite catalyst is disclosed in U.S. Pat. No. 3,985,640; entitled "Cracking with Zeolite Catalysts Promoted with Uranium or Uranium Plus Silver"; issued to Lussier et al, on Oct. 12, 1976. Particularly, the reference relates to zeolite promoted hydrocracking catalysts consisting of a type X or Y faujasite zeolite exchanged with uranium or uranium in combination with silver ions dispersed on a kaolin clay, amorphous silica alumina matrix. The catalyst is said to be highly active and selective for the production of gasoline from gas oils.

High surface area aluminum phosphate gels, methods of making and using them as catalysts or catalyst supports are disclosed in U.S. Pat. No. 3,342,750; entitled "Compositions Containing Stable Aluminum Phosphate Gel and Methods of Making and Using Same", issued to Kearby, on Sept. 19, 1967. In particular, the reference relates to the preparation of aluminum phosphate gels, in a preferred mode, by reacting ethylene oxide with a cold aqueous solution of aluminum chloride and phosphoric acid. The aluminum phosphate gels are next calcined and used as catalysts or supports in a hydrocarbon cracking process.

U.S. Pat. No. 3,904,550; entitled "Hydrocarbon Conversion Catalyst Comprising Alumina and Aluminum Phosphate", issued to Pine, on Sept. 9, 1975, discloses a catalyst support consisting of alumina and aluminum phosphate which is prepared by reacting an aluminum alkoxide with an aqueous solution containing phosphate ions. The product is recovered and calcinated, which in turn can be combined with various known catalyst components, for example, zeolites, to produce a hydrocarbon cracking or desulfurization and denitrogenation catalyst. It is to be noted that the above-cited references fail to appreciate a catalyst system comprising a type X or Y zeolite composited with an alumina-aluminum phosphate-silica matrix to increase gasoline production and quality in a hydrocarbon cracking process.

SUMMARY OF THE INVENTION

We have discovered a process for increasing the gasoline yield and quality in a petroleum cracking reaction by utilizing a catalyst possessing high activity and selectivity to gasoline production, as well as superior tolerance of high metals charge stocks. Particularly, our invention comprises a process for increasing gasoline yield in a petroleum cracking reaction by contacting a hydrocarbon feedstock under catalytic cracking conditions with a catalyst comprising an alumina-aluminum phosphate-silica matrix having an average pore radius of from about 10° A to about 200° A, preferably from about 75° A to about 150° A; a surface area ranging from about 50 m²/g to about 300 m²/g, preferably from about 125 m²/g to about 275 m²/g; and a pore volume of from about 0.1 cc/g to about 1.2 cc/g; preferably from about 0.6 cc/g to about 1.0 cc/g and wherein the alumina-aluminum phosphate-silica matrix has a molar ratio range of from about 15:80:5 to about 60:10:30, especially from about 30:60:10 to about 50:30:20; and wherein said matrix retains at least 70% of its surface area when the matrix is additionally calcined at a temperature up to about 900° C. for about 16 hours, said matrix being composited with from about 5 to about 50 weight percent, especially from about 5 to about 35 weight percent of a REY-zeolite.

DESCRIPTION OF THE INVENTION

This invention resides in an improved process for increasing the gasoline yield and quality in a catalytic cracking process of either light of heavy feedstocks which can contain a high metals content. Particularly, the process involves contacting a hydrocarbon feedstock with a catalyst comprising a REY-zeolite composited with an alumina-aluminum phosphate silica matrix.

Typical zeolites or molecular sieves having cracking activity and which can be suitably dispersed in a matrix for use as a catalytic cracking catalyst are well known in the art. Suitable zeolites are described, for example, in U.S. Pat. No. 3,660,274 to James J. Blazek et al. The description of the crystalline aluminosilicates in the Blazek et al patent is incorporated herein by reference. Synthetically prepared zeolites are initially in the form of alkali metal aluminosilicates. The alkali metal ions are exchanged with rare earth metal ions to impart cracking characteristics to the zeolites. The zeolites are, of course, crystalline, three-dimensional, stable structures containing a large number of uniform openings or cavities interconnected by smaller, relatively uniform holes or channels. The effective pore size of synthetic zeolites is suitably between 6° A and 15° A in dimeter. The overall formula for the zeolites can be repesented as follows:

$$xM_{2/n}O:Al_2O_3:1.5\text{--}6.5\ SiO_2:yH_2O$$

where M is a metal cation and n its valence and x varies from 0 to 1 and y is a function of the degree of dehydration and varies from 0 to 9, M is preferably a rare earth metal cation such as lanthanum, cerium, praseodymium, neodymium, etc., or mixtures of these.

Zeolites which can be employed in accordance with this invention include both natural and synthetic zeolites. These zeolites include gmelinite, chabazite, dachiardite, clinoptilolite, faujasite heulandite, analcite, levynite, erionite, sodalite, cancrinite, nepheline, lazurite, scolecite, natrolite, offretite, mesolite, mordenite, brewsterite, ferrierite, and the like. The faujasites are preferred. Suitable synthetic zeolites which can be treated in accordance with this invention include zeolites X, Y, A, L, ZK-4, B, E, F, HJ, M, Q, T, W, Z, alpha and beta, ZSM-types and omega. The term "zeolites" as used herein contemplates not only aluminosilicates but substances in which the aluminum is replaced by gallium and substances in which the silicon is replaced by germanium.

The preferred zeolites for this invention are the synthetic faujasites of the types Y and X or mixtures thereof; however, the Y-type zeolites are superior when used herein.

It is to be noted that some X-type zeolite will be mixed with the Y-type zeolite due to the difficulty and cost involved in separating the two zeolites. It is additionally noted that the presence of small amounts of the X-type zeolite will not substantially impair the superior selectivity to gasoline production of the catalysts herein.

It is also well known in the art that to obtain good cracking activity the zeolites have to be in a proper form. In most cases this involves reducing the alkali metal content of the zeolite to as low a level as possible. Further, a high alkali metal content reduces the thermal structural stability, and the effective lifetime of the catalyst will be impaired as a consequence thereof. Procedures for removing alkali metals and putting the zeolite in the proper form are well known in the art as described in U.S. Pat. No. 3,537,816.

The crystalline aluminosilicate zeolites, such as synthetic faujasite, will under normal conditions, crystalize as regularly shaped, discrete particles of approximately one to ten microns in size, and, accordingly, this is the size range normally used in commercial catalysts. Preferably the particle size of the zeolites is from 0.5 to 10 microns and more preferably is from 1 to 2 microns or less. Crystalline zeolites exhibit both an interior and an exterior surface area, with the largest portion of the total surface area being internal. Blockage of the internal channels by, for example, coke formation and contamination by metals poisoning will greatly reduce the total surface area. Therefore, to minimize the effect of contamination and pore blockage, crystals larger than the normal size cited above are preferably not used in the catalyst of this invention.

The term REY-zeolites as defined herein is the Y-type zeolite that has undergone an ion exchange reaction with rare earth metal ions. The naturally occurring molecular sieve zeolites are usually found in the sodium form, an alkaline earth metal form, or mixed forms. The synthetic molecular sieves are normally in their sodium form, however, it should be understood that other alkali metal compounds can be substituted therefor. In their sodium form, the Y zeolites suitable for use herein correspond to the general formula:

$$0.9 \pm 0.2 NaO:Al_2O_3:nSiO_2: xH_2O$$

wherein n is an integer of from about 3 to about 6 and x is an integer of from about 0 to about 9. It is to be noted that after the ion exchange reaction with the rare earth metals, the sodium content of the Y zeolite is from about 0.03 to about 1 molar percent, especially from about 0.5 to about 0.8 molar percent. When sodium is present above this molar range, it tends to deactivate the catalyst and to reduce the sodium content below 0.3 molar percent is too expensive to justify.

Rare earth metals can conveniently be substituted for the sodium in the Y zeolite above using conventional techniques and methods. A wide variety of rare earth compounds can be ion exchanged with the above sodium ions. Operable compounds include rare earth chlorides, bromides, iodides, carbonates, bicarbonates, sulfates, sulfides, thiocyanates, peroxysulfates, acetates, benzoates, citrates, fluorides, nitrates, formates, propionates, butyrates, valecates, lactates, malanates, oxalates, palmitates, hydroxides, tartrates and the like. The preferred rare earth salts are the chlorides, nitrates and sulfates. It is to be noted that the only limitation on the particular rare earth metal salt or salts employed is that it be sufficiently soluble in the ion exchange fluid medium in which it is used to give the necessary rare earth ion transfer.

Representative of the rare earth metals are cerium, lanthanum, praseodymium, neodymium, illinium, samarium, europium, gadolinium, terbium, dysprosium, holmium, erbium, thulium, scandium, yttrium, and lutecium.

The rare earth metal salts employed can either be the salt of a single rare earth metal or mixtures of rare earth metals, such as rare earth chlorides of didymium chloride. As hereinafter referred to, unless otherwise indicated, a rare earth chloride solution is a mixture of rare earth chlorides consisting essentially of the chlorides of lanthanum, cerium, neodymium and praseodymium with minor amounts of samarium, gadolinium and yttrium. Rare earth chloride solutions are commercially available and the ones specifically referred to in the examples contain the chlorides of the rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, and other rare earth oxides 0.8% by weight. Didymium chloride is also a mixture of rare earth chlorides but having a lower cerium content. It consists of the following rare earths determined as oxides: lanthanum 45–56% by weight, cerium 1–2% by weight, praseodymium 9–10% by weight, neodymium 32–33% by weight, samarium 5–7% by weight, gadolinium 3–4% by weight, yttrium 0.4% by weight, and other rare earths 1–2% by weight. It is to be understood that other mixtures of rare earths are also applicable for the preparation of the novel compositions of this invention, although lanthanum, neodymium, praseodymium, samarium and gadolinium as well as mixtures of rare earth cations containing a predominant amount of one or more of the above cations are preferred since these metals provide optimum activity for hydrocarbon conversion, including catalytic cracking.

The matrix with which the REY-zeolite is composited is preferably an alumina-aluminum phosphate-silica of the general formula:

$$Al_2O_3 - AlPO_4 - SiO_2$$

Normally the alumina-aluminum phosphate-silica constituents are in a mole percent ratio range of from about 15:80:5 to about 60:10:30, preferably from about 30:60:10 to about 50:30:70. The above alumina-aluminum phosphate-silica matrix can be prepared according to techniques and methods normally used in the art. One such method is set forth in U.S. Pat. No. 3,904,550 issued to Pine, the disclosure of which is incorporated herein by reference. Another method is set forth in U.S. Pat. No. 4,080,311 issued to Kehl, which discloses thermally stable composite precipitates containing alumina and aluminum phosphate.

The REY-zeolite is composited with the alumina-aluminum phosphate-silica matrix from about 5 to about 50 weight percent, preferably from about 5 to about 35 weight percent, based on the weight of said matrix. The method of forming the final composited catalyst does not form a part of this invention, and any method well known to those skilled in the art is acceptable. For example, finely divided REY-zeolite can be admixed with finely divided alumina-aluminum phosphate-silica, and the mixture spray dried using conventional methods to form the final catalyst. The above-described composite catalysts are highly selective to gasoline production and have a high tolerance to metals.

It is to be noted, that the above matrix is characterized, after calcination at 500° C. for 16 hours, as amorphous and having a surface area from about 125 m²/g to about 275 m²/g, an average pore radium of from about 75° A to about 150° A, and wherein no more than a 30% decrease in surface area is obtained when said matrix is additionally calcined at a temperature of about 900° C. for 16 hours. The matrix results in a final catalyst which has excellent attrition properties, i.e., an attrition index of about 10 or less.

Typical feedstocks include light or heavy gas oils, light fractions of crude oil, heavy fractions of crude oil, or the like. Any type reaction vessel can be used in this invention which is normally used in the art. For example, U.S. Pat. No. 3,944,482 to Mitchell et al sets forth a suitable reaction vessel, reaction conditions, and process therefor, the teachings of which are incorporated herein by reference.

The weight ratio of catalyst to hydrocarbon feedstock is from about 4:1 to about 12:1, preferably from about 6:1 to about 10:1. The fresh hydrocarbon feedstock is generally preheated to a temperature of from about 316° C. to about 371° C., but is held below the vaporization point of said hydrocarbon feedstock. Additional heat required to achieve the desired reactor temperature is imparted to the reaction mixture by hot, regenerated catalyst.

The reactor linear velocity, should not be sufficiently high to induce turbulence or excessive backmixing, however, the reactor linear velocity must be sufficiently high so that substantially no catalyst accumulation or build up occurs in the reactor because such accumulation leads to backmixing.

Avoiding a catalyst build up in the reactor results in a very low catalyst inventory in the reactor, which results in a high space velocity. It is to be noted that conditions such as reactor size, etc., will determine the space velocity of the process. However, the space velocity herein is from about 35 to about 500 weight of hydrocarbon feedstock per hour per weight of catalyst, especially from about 50 to about 300 weight of hydrocarbon feedstock per hour per weight of catalyst. It is to be noted that the above conditions and description of operation are for a preferred fluid bed riser cracking operation.

The zeolite riser cracking conditions and system (known as FCC or fluid catalytic cracking) of this invention are described in greater detail in U.S. Pat. No. 3,617,512, the disclosure of which is incorporated herein by reference. However, the older conventional fluid bed operation or a fixed-bed operation can be used, the particular reaction condition, etc., are well known in the art and are not part of the present invention.

We have discovered that an alumina-aluminum phosphate-silica matrix, substantially as described herein, which has a low intrinsic cracking activity, interacts synergistically with a REY-zeolite, as herein described, to produce a cracking catalyst of high activity giving superior selectivity for gasoline production and quality.

The hydrocarbon feedstock used herein was a Kuwait gas oil having a boiling range of from about 260° C. to about 426° C. Inspections of this Kuwait gas oil are shown in Table I below.

Table I

| KUWAIT GAS OIL INSPECTIONS | |
|---|---|
| Stock Identification | MAT Feedstocks |
| Inspections: | |
| Gravity, API, D-287 | 23.5 |
| Viscosity, SUS D2161, 130° F. | 94.7 |
| Viscosity, SUS D2161, 150° F. | 70.5 |
| Viscosity, SUS D2161, 210° F. | 50.8 |

Table I-continued

| KUWAIT GAS OIL INSPECTIONS | |
|---|---|
| Stock Identification | MAT Feedstocks |
| Pour Point, D97, ° F. | +80 |
| Nitrogen, wt % | 0.074 |
| Sulfur, wt % | 2.76 |
| Carbon, Res., D524, wt % | 0.23 |
| Bromine No., D1159 | 5.71 |
| Aniline Point, ° F. | 176.5 |
| Nickel, ppm | <0.1 |
| Vanadium, ppm | <0.1 |
| Distillation, D1160 at 760 mm | |
| End Point, ° C. | 426 |
| 5 Pct. Cond. | 263 |
| Approx. Hydrocarbon Type Analysis: Vol % | |
| Carbon as Aromatics | 23.1 |
| Carbon as Naphthenes | 10.5 |
| Carbon as Paraffins | 66.3 |

DESCRIPTION OF THE PREFERRED EMBODIMENTS

EXAMPLE I

An alumina-aluminum phosphate-silica matrix was prepared according to the following procedure:

A first mixture was prepared by adding to 4 liters of water, 750.3 grams of aluminum nitrate and 115.2 grams of 85% phosphoric acid. To the resulting mixture was added 1207 grams of silicic acid at 1.59% $SiO_2$ (19.2 grams $SiO_2$).

A second mixture was prepared by diluting 550 ml. of 58% ammonium hydroxide with 550 ml. of water. The two solutions, one containing the silicic acid mixture and the other containing the ammonium hydroxide mixture were added with agitation to 2.5 liters of water at relative rates, so as to maintain the solution pH at 8.0. The mixture was agitated for an additional ½ hour after completion of the above addition. The resulting mixture was filtered-washed with 2 liters of water and dried.

The above alumina-aluminum phosphate-silica matrix, after calcination, is characterized by an average surface area of 193 $m^2/g$, an average pore radius of 99° A and an average pore volume of 0.96 cc/g. It is to be noted that the large pore radius, of the above matrix, is highly beneficial for enhancing metals tolerance in the completed catalyst. The silica in the above matrix serves as a binding agent and, additionally, enhances the catalyst acidity and thus its cracking activity. The above matrix can be slurried with a REY-zeolite as herein described to produce the desired catalyst.

EXAMPLE II

A representative REY-zeolite catalyst was prepared according to the following procedure:

Into a 4-liter, 3-necked flask equipped with a mechanical stirrer, a water-cooled condenser and thermometer were added 2400 ml. of water heated to 80° C., with stirring. To the water was added 800 grams of sodium Y zeolite and 564 grams rare earth chloride mixture comprising 48% cerium, 24% lanthanum, 5% praseodymium, 17% neodymium, 3% samarium, 2% gadolinium and 0.8% other rare earth compounds. It is to be noted that all percent are by weight. The temperature was maintained at 80° C. for two hours with continued stirring and the reaction mixture was then filtered. The filtered REY-zeolite was reslurried with 2400 ml. of water and heated to a temperature of 80° C. Next, an additional 564 grams of the above rare earth chloride mixture was added to the solution. The temperature was maintained at 80° C. for two hours with stirring. The resulting REY-zeolite was filtered and washed with eight 1-liter batches of water.

The REY-zeolite was calcined at 538° C. for 10 hours, slurried with 2400 ml. of water and heated to 80° C. The procedure set forth above for the addition of the rare earth chloride mixture to the Y-type zeolite was repeated two additional times and the final reaction product was filtered and washed with eight 1-liter batches of water.

Next, the matrix produced in Example I was slurried and added to the REY-zeolite produced above. The slurry was then spray dried and calcined for 10 hours at 500° C. to produce the desired catalyst. It is to be noted that the REY-zeolite content of the catalyst can be varied according to the wishes of the formulator, however, a weight percent of from about 5% to about 35% based on the total catalyst weight is desirable, especially 15 weight percent.

EXAMPLES III TO VIII

In Examples III to VIII a comparison was made between a REY-zeolite alumina-aluminum phosphate-silica catalyst, as defined herein, and similar commercially available catalysts. The catalysts were evaluated using a microactivity test (MAT) unit similar to the Standard Davison MAT (see Ciapetta, F. C. and Handerson, D. S. "Oil and Gas Journal", 65,88, 1967). Catalyst samples were tested at 482° C., 15 weight hourly space velocity; 80 seconds catalyst contact time and a catalyst to oil ratio of 2.9. The charge stock was a Kuwait gas oil having a boiling range of from about 260° C. to about 426° C. (see Table I for inspection). The results are set forth in Table II below.

Table II

| COMPARISON OF HYDROCRACKING CATALYSTS WITH AND WITHOUT REY-ZEOLITE | | | | | | |
|---|---|---|---|---|---|---|
| | III | IV | V | VI | VII | VIII |
| Catalyst | Silca-Alumina | Silica-Alumina + 15% REY-Zeolite of Ex. II | Alumina-Aluminum Phosphate-Silica | Alumina-Aluminum Phosphate-Silica +15% REY-Zeolite of Ex. II | Commercial Version of Ex. VI | Filtrol 75F[1] |
| Conversion Vol. % ff[2] | 48.9 | 82.7 | 26.0 | 78.9 | 80.5 | 70.6 |
| $C_5$ + gasoline Vol % ff | 29.3 | 54.4 | 18.0 | 55.3 | 57.2 | 47.7 |
| % selectivity to gasoline | 59.9 | 65.8 | 69.2 | 70.1 | 71.0 | 67.6 |
| BTX content[3] | | | | | | |

Table II-continued
COMPARISON OF HYDROCRACKING CATALYSTS WITH AND WITHOUT REY-ZEOLITE

| Catalyst | III<br>Silca-Alumina | IV<br>Silica-Alumina<br>+ 15% REY-Zeolite<br>of Ex. II | V<br>Alumina-Aluminum<br>Phosphate-Silica | VI<br>Alumina-<br>Aluminum<br>Phosphate-<br>Silica +15%<br>REY-Zeolite<br>of Ex. II | VII<br>Commercial<br>Version of<br>Ex. VI | VIII<br>Filtrol<br>75F[1] |
|---|---|---|---|---|---|---|
| wt % ff | — | 5.9 | — | 7.0 | 7.0 | 5.5 |
| Carbon, wt % ff | 2.5 | 5.0 | 2.7 | 4.7 | 2.7 | 3.5 |
| Hydrogen, wt % ff | 0.05 | 0.05 | 0.22 | 0.05 | 0.04 | 0.03 |

[1]Filtrol 75F = A catalyst marketed commercially by the Filtrol Corporation, located in Los Angeles, Ca., which contains 15 wt % zeolite
[2]ff = Fresh feed
[3]BTX content = Benzene, toluene and xylenes content It is to be noted that the catalysts in Examples VI and VII exhibited superior conversion of the feedstock as well as selectivity to gasoline production and BTX content.

EXAMPLE IX

A cracking catalyst was prepared according to the following procedure: to a 5-liter, 3-necked flask, equipped with a stirrer, condenser and thermometer was added 1157 grams of aluminum secondary butoxide. A solution was prepared by mixing 1667 ml. of isopropyl alcohol, 290 grams of phosphoric acid and 60 cc. of water. This solution was added to the 5-liter flask over a period of 5 hours. The flask temperature was maintained at 80° C. during the addition period for the above solution. The contents of the flask were cooled, filtered and washed with isopropyl alcohol. To 685 grams of this filter cake (containing 219 grams of solids) dispersed in 100 grams of water were added 93.9 grams of ethyl orthosilicate which was dispersed in 120 ml. of ethanol. To this mixture was added 91.5 grams (47.5 wt. % solids) REY-zeolite, as described in Example II, and 1200 cc. of water to adjust the solids content to 10.4 weight percent. The resulting slurry was spray dried and calcined for 10 hours at 500° C. to produce the desired catalyst.

EXAMPLE X

A REY-zeolite alumina-aluminum phosphate-silica cracking catalyst containing 15 wt. % REY-zeolite, was prepared by adding 500 grams of aluminum chloride, 930 cc. of water and 164 grams of ethyl orthosilicate to a 4-liter beaker. Next, 119 grams of phosphoric acid was slowly added to this solution over a 5-minute time period. This solution was then cooled to approximately 0° C. and ethylene oxide gas was bubbled through the solution until the solution gel point was obtained. The gel was then filtered, followed by an isopropyl alcohol and water wash at an isopropyl alcohol to water ratio of 1:1 respectively.

The solids content of the filter cake was determined to be 9.3%. To 2000 grams of this filter cake (containing 187 grams of solids) was added 69.5 grams (47.5 wt. % solids) REY-zeolite, as defined in Example II, dispersed in water to give a final composition containing 15% by weight REY-zeolite. The resulting catalyst was spray dried and calcined at 500° C. for 10 hours.

EXAMPLES XI to XIII

The cracking catalysts were evaluated according to the procedure of Examples III to VIII with the following results:

Table III
CATALYST MAT[1] ACTIVITY DATA

| Example<br>Catalyst Description | XI<br>Catalyst of Ex. II | XII<br>Catalyst of Ex. IX | XIII<br>Catalyst of Ex. X |
|---|---|---|---|
| Temperature ° F. | 900 | 900 | 900 |
| Conversion, vol % ff[2] | 78.9 | 76.2 | 71.3 |
| $C_5$ + gasoline, vol % ff | 55.3 | 51.9 | 46.4 |
| BTX[3], wt % ff | 7.0 | 5.3 | 5.5 |
| Carbon, wt % ff | 4.7 | 3.5 | 3.7 |
| Hydrogen, wt % ff | 0.05 | 0.09 | 0.07 |
| Selectivity to Gasoline, % | 70.1 | 68.1 | 65.1 |
| Selectivity to BTX, % | 8.9 | 7.0 | 7.7 |

[1]MAT = Micro Activity Test Unit
[2]ff = Fresh Feed
[3]BTX = Benzene, toluene and xylenes The catalysts of this invention exhibited superior conversion of the feedstock as well as selectivity to gasoline production and BTX content.

EXAMPLES XIV to XVIII

The catalyst of Example II was examined for metals tolerance by synthetically contaminating said cracking catalyst with several concentration levels of nickel and vanadium. The series was prepared by impregnating the catalyst with nickel and vanadium naphthenates to metals levels of 1200, 1900, 3000 an 5000 parts per million (ppm) nickel equivalents. Parts per million nickel equivalents herein means the total ppm of nickel plus one-fifth of the total ppm of vanadium by weight deposited on the catalyst. The test procedure of Examples III to VIII was followed with the following results:

Table IV

| CATALYST METALS TOLERANCE - MAT[1] DATA | | | | | |
|---|---|---|---|---|---|
| EXAMPLE | XIV | XV | XVI | XVII | XVIII |
| Catalyst Description | Cat. of Ex. II | Cat. of Ex. II | Cat. of Ex. II | Cat. of Ex. II | Cat. of Ex. II |
| Temperature, °F. | 900 | 900 | 900 | 900 | 900 |
| Metals Concentration, PPM[2] | 0 | 1200 | 1900 | 3000 | 5000 |
| Conversion, Vol % ff[3] | 78.9 | 73.5 | 70.5 | 65.8 | 62.1 |
| $C_5$ + Gasoline, Vol % ff | 55.3 | 48.0 | 45.0 | 40.4 | 37.9 |
| Carbon, wt % ff | 4.7 | 6.4 | 7.5 | 7.7 | 7.7 |
| Hydrogen, wt % ff | 0.05 | 0.60 | 0.77 | 0.84 | 0.89 |

[1]MAT = Micro Activity Test Unit
[2]Expressed as nickel equivalents (total PPM of nickel plus one-fifth of the total PPM of vanadium by weight)
[3]ff = Fresh Feed As can readily be determined from the above data, the catalyst compositions of this invention maintain high conversion and gasoline yields as well as produce acceptable levels of coke and hydrogen when contaminated with the herein described concentration of metals (i.e., they possess superior metals tolerance).

EXAMPLES XIX to XXIII

The catalyst of Example IX was examined according to the procedure of Examples XIV to XVII. The results are tabulated in Table V below.

Table V

| CATALYST METALS TOLERANCE MAT[1] DATA | | | | | |
|---|---|---|---|---|---|
| EXAMPLE | XIX | XX | XXI | XXII | XXIII |
| Catalyst Description | Cat. of Ex. IX | Cat. of Ex. IX | Cat. of Ex. IX | Cat. of Ex. IX | Cat. of Ex. IX |
| Temperature, °F. | 900 | 900 | 900 | 900 | 900 |
| Metals Concentration, PPM[2] | 0 | 1200 | 1900 | 3000 | 5000 |
| Conversion, vol. % ff[3] | 76.2 | 63.1 | 60.0 | 55.5 | 49.6 |
| $C_5$ + Gasoline, vol. % ff | 51.9 | 37.0 | 34.1 | 27.1 | 24.5 |
| Carbon, wt % ff | 3.5 | 6.2 | 7.5 | 8.2 | 8.5 |
| Hydrogen, wt % ff | 0.09 | 0.94 | 1.10 | 1.20 | 1.24 |

[1]MAT = Micro Activity Test Unit
[2]Expressed as nickel equivalents (total PPM of nickel plus one-fifth of the total PPM of vanadium by weight)
[3]ff = Fresh Feed As can readily be seen from the above data the catalyst compositions of this invention are superior in its cracking activity; selective to gasoline yield and, additionally, exhibits excellent metals tolerance, attrition and thermal stability properties.

Obviously, many modifications and variations of the invention, as hereinbefore set forth, can be made without departing from the spirit and scope thereof, and therefore only such limitations should be imposed as are indicated in the appended claims.

We claim:

1. A process for increasing the gasoline yield and quality in a petroleum cracking reaction by contacting a hydrocarbon feedstock under catalytic cracking conditions with a catalyst comprising an alumina-aluminum phosphate-silica matrix characterized after calcination at 500° C. for 16 hours as amorphous, and having an average pore radius of from about 10° A to about 200° A; a surface area ranging from about 50 m²/g to about 300 m²/g; a pore volume of from about 0.1 cc/g to about 1.2 cc/g; and wherein the alumina-aluminum phosphate-silica matrix has a mole percent ratio of from about 15:80:5 to about 60:10:30 and wherein said matrix retains at least 70% of its surface area when the matrix is additionally calcined at a temperature up to about 900° C. for about 16 hours; said matrix being composited with from about 5 to about 50 weight percent of a REY-zeolite.

2. The process according to claim 1 wherein the alumina-aluminum phosphate-silica matrix has an average pore radius of from about 75° A to about 150° A.

3. The process of claim 1 wherein the alumina-aluminum phosphate-silica matrix has a surface area of from about 125 m²/g to about 275 m²/g.

4. The process according to claim 1 wherein the alumina-aluminum phosphate-silica matrix has a pore volume of from about 0.6 cc/g to about 1.0 cc/g.

5. The process of claim 1 wherein the alumina-aluminum phosphate-silica matrix has a mole percent ratio range of from about 30:60:10 to about 50:30:20.

6. The process according to claim 1 wherein from about 5 to about 35 weight percent REY-zeolite is composited with the alumina-aluminum phosphate-silica matrix.

7. The process of claim 1 wherein the REY-zeolite contains a rare earth metal selected from the group consisting of cerium, lanthanum, praseodymium, neodymium, illinium, samarium, europium, gadolinium, terbium, dysprosium, holmium, erbium, thulium, scandium, yttrium, lutecium and mixtures thereof.

8. The process according to claim 1 wherein the REY-zeolite contains a rare earth metal selected from the group consisting of cerium, lanthanum, praseodymium, neodymium, samarium, gadolinium, and mixtures thereof.

9. The process according to claim 1 wherein the REY-zeolite is a type Y synthetic faujasite.

10. The process according to claim 1 wherein the hydrocarbon feedstock is a gas oil.

11. The process of claim 1 wherein the hydrocarbon feedstock and catalyst are contacted at a molar ratio of from about 4:1 to about 12:1.

12. The process of claim 1 wherein the hydrocarbon feedstock and catalyst are contacted at a molar ratio of from about 6:1 to about 10:1.

13. The process according to claim 1 wherein the hydrocarbon feedstock and catalyst are contacted at a temperature of from about 400° C. to about 760° C.

14. The process according to claim 1 wherein the hydrocarbon feedstock and catalyst are contacted at a temperature of from about 475° C. to about 650° C.

15. The process of claim 1 wherein the hydrocarbon feedstock and catalyst are contacted at atmospheric pressure.

16. The process according to claim 1 wherein the hydrocarbon feedstock and catalyst are contacted at an hourly space velocity of from about 35 to about 500.

17. The process of claim 1 wherein the hydrocarbon feedstock and catalyst are contacted at an hourly space velocity of from about 50 to about 300.

* * * * *

UNITED STATES PATENT OFFICE
CERTIFICATE OF CORRECTION

Patent No. 4,158,621   Dated June 19, 1979

Inventor(s) Harold E. Swift, John J. Stanulonis, Elizabeth H. Reynolds

It is certified that error appears in the above-identified patent and that said Letters Patent are hereby corrected as shown below:

COLUMNS 9 and 10, Table II,
Hydrogen, wt % ff, Example V, Alumina-Aluminum Phosphate-Silica "0.22 0.05" should read --0.22--

Hydrogen, wt % ff, Example VI, Alumina-Aluminum Phosphate-Silica + 15% REY-Zeolite of Ex. II "0.04 0.03" should read --0.05--

Hydrogen, wt % ff, Example VII, Commercial Version of Ex. VI, should read --0.04--

Hydrogen, wt % ff, Example VIII, Filtrol 75F[(1)], should read --0.03--

Signed and Sealed this

Thirteenth Day of November 1979

[SEAL]

Attest:

RUTH C. MASON
Attesting Officer

LUTRELLE F. PARKER
Acting Commissioner of Patents and Trademarks